(12) United States Patent
Shiga et al.

(10) Patent No.: US 11,360,487 B2
(45) Date of Patent: Jun. 14, 2022

(54) DRIVING SUPPORT APPARATUS, VEHICLE, DRIVING SUPPORT SYSTEM, AND DRIVING SUPPORT METHOD

(71) Applicant: TOYOTA JIDOSHA KABUSHIKI KAISHA, Toyota (JP)

(72) Inventors: Takahiro Shiga, Chiryu (JP); Mami Kato, Toyota (JP); Masato Endo, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 209 days.

(21) Appl. No.: 16/544,982

(22) Filed: Aug. 20, 2019

(65) Prior Publication Data
US 2020/0117215 A1    Apr. 16, 2020

(30) Foreign Application Priority Data
Oct. 12, 2018  (JP) .............................. JP2018-193259

(51) Int. Cl.
 *G05D 1/02*  (2020.01)
 *G06Q 50/30*  (2012.01)

(52) U.S. Cl.
 CPC ......... *G05D 1/0276* (2013.01); *G05D 1/0212* (2013.01); *G05D 2201/0212* (2013.01); *G06Q 50/30* (2013.01)

(58) Field of Classification Search
 CPC .............. G05D 1/0276; G05D 1/0212; G05D 2201/0212; G06Q 50/30; B60K 2370/573;
(Continued)

(56) References Cited

U.S. PATENT DOCUMENTS

2017/0370744 A1   12/2017  Miyajima
2019/0079519 A1*   3/2019  Hwang ................. G06Q 50/30

FOREIGN PATENT DOCUMENTS

CN    106408099 A    2/2017
CN    207037465 U    2/2018
(Continued)

OTHER PUBLICATIONS

Toyota Motor Corporation, Mobility Service-specific EV "e-Palette Concept", Jan. 8, 2018, Internet <URL: https://newsroom.toyota.co.jp/jp/corporate/20508200.html>.

*Primary Examiner* — Rodney A Butler
(74) *Attorney, Agent, or Firm* — Oliff PLC

(57) ABSTRACT

A driving support apparatus includes a communication device configured to communicate with a vehicle-mounted device installed in a vehicle that's under automatic driving control; and a processor configured to determine, upon receiving a stop request by a passenger who is riding in the vehicle from a mobile terminal of the passenger or the vehicle-mounted device of the vehicle through the communication device, a stop location in accordance with the stop request; generate a driving route of the vehicle from a present location of the vehicle to the stop location; and calculate a stop time required to stop the vehicle at the stop location, based on the driving route to the stop location, and when the stop time is less than an allocated time for the stop request, send a stop command for moving the vehicle to the stop location to the vehicle-mounted device of the vehicle through the communication device.

7 Claims, 10 Drawing Sheets

(58) Field of Classification Search
CPC ........ B60K 2370/566; B60W 2756/10; B60W 60/00253; G08G 1/168; G08G 1/096725; G08G 1/096805
See application file for complete search history.

(56) References Cited

FOREIGN PATENT DOCUMENTS

| | | | |
|---|---|---|---|
| JP | H02-162290 | A | 6/1990 |
| JP | 2003-226184 | A | 8/2003 |
| JP | 2006-21850 | A | 1/2006 |
| JP | 2008-059310 | A | 3/2008 |
| JP | 2013-015360 | A | 1/2013 |
| JP | 2018-062237 | A | 4/2018 |
| JP | 2018-067172 | A | 4/2018 |
| WO | 2014/118912 | A1 | 8/2014 |
| WO | 2016/121174 | A1 | 8/2016 |
| WO | 2017/127158 | A1 | 7/2017 |

* cited by examiner

DRIVING SUPPORT APPARATUS, VEHICLE, DRIVING SUPPORT SYSTEM, AND DRIVING SUPPORT METHOD

FIELD

The present invention relates to a driving support apparatus, a vehicle, a driving support system, and a driving support method.

BACKGROUND

In recent years, automatic driving technologies have been developed with the aim of realizing mobility services such as taxi, bus, and ride sharing services using automatic driving vehicles that are driven by automatic control.

For example, a non-patent literature (TOYOTA MOTOR CORPORATION, Mobility Service-specific EV "e-Palette Concept" [retrieved on Aug. 31, 2018], Internet <URL: https://newsroom.toyota.cojp/jp/corporate/20508200.html>) discloses a vehicle control I/F (interface) for controlling a vehicle, and describes the vehicle that enables a manufacturer other than the maker of the vehicle to develop an automatic driving kit including software for automatic driving control for the vehicle. Since the automatic driving kit is configured to be replaceable or updatable, the automatic driving control can be optimized in conformance with Mobility-as-a-Service (MaaS) in the fields of movement, logistics, product sales, and the like.

Although automatic driving vehicles have the advantage that crew members such as drivers are unnecessary, it is difficult, for example, to keep the automatic driving vehicles waiting at exit points for prescribed time. Therefore, in the technology described in Japanese Patent Publication (Kokai) No. 2018-67172, for example, when an automatic driving vehicle arrives at a destination, a user sets his or her behavior after exit by a voice input, such as "bathroom", to a microphone, and then exits the automatic driving vehicle. The controller of the automatic driving vehicle recognizes the user's voice input of "bathroom" and estimates a prescribed time at 5 minutes in this example, so the automatic driving vehicle waits in the position. The controller certifies the user who has returned within the prescribed time or within an allowable time slightly longer than the prescribed time, and permits the user to reenter the vehicle.

SUMMARY

However, passengers riding in automatic driving vehicles sometimes wish to stop at a bathroom or the like, before the automatic driving vehicle arrives at the destination. Therefore, provided passengers are riding in a vehicle that is under automatic driving control, a technology for appropriately determining whether or not to stop the vehicle at a stop location is demanded.

The present invention aims to provide a driving support apparatus that can enable appropriate determination of whether or not to stop a vehicle that contains passengers and is under automatic driving control, at a stop location.

A driving support apparatus according to an embodiment of the present invention includes a communication device configured to be able to at least communicate with a vehicle-mounted device installed in a vehicle that is under automatic driving control; and a processor configured to determine, upon receiving a stop request by a passenger who is riding in the vehicle from a mobile terminal of the passenger or the vehicle-mounted device of the vehicle through the communication device, a stop location in accordance with the stop request; generate a driving route of the vehicle from a present location of the vehicle to the stop location; and calculate a stop time required to stop the vehicle at the stop location, based on the driving route to the stop location, and when the stop time is less than an allocated time for the stop request, send a stop command for moving the vehicle to the stop location to the vehicle-mounted device of the vehicle through the communication device.

The driving support apparatus preferably further includes a memory that stores a destination and a target arrival time of another passenger who is riding in the vehicle. The processor preferably generates a second driving route for moving the vehicle from the present location of the vehicle to the destination of the other passenger via the stop location. The processor preferably calculates an expected arrival time at which the vehicle is expected to arrive at the destination of the other passenger, after the vehicle has stopped at the stop location, based on the second driving route, and preferably determines the allocated time in accordance with a margin time between the expected arrival time and the target arrival time.

In the driving support apparatus, when the stop time is equal to or greater than the allocated time, the processor preferably sends a signal for displaying a query requesting permission to stop the vehicle at the stop location to a mobile terminal of the other passenger or the vehicle-mounted device of the vehicle. Upon receiving a signal indicating permission by the other passenger to stop the vehicle at the stop location from the mobile terminal of the other passenger or the vehicle-mounted device of the vehicle, the processor preferably sends the stop command to the vehicle-mounted device of the vehicle.

In the driving support apparatus, upon receiving a signal indicating that the passenger has exited the vehicle which has stopped at the stop location from the mobile terminal of the passenger or the vehicle-mounted device of the vehicle through the communication device, the processor preferably sends a signal for displaying a remaining stop time of the vehicle on the mobile terminal of the passenger to the mobile terminal of the passenger through the communication device.

In the driving support apparatus, when the stop time is equal to or greater than the allocated time, the processor preferably retrieves a second vehicle that is present within a certain range from the present location of the vehicle. The processor preferably sends a signal for dispatching the retrieved second vehicle to a dispatch point within the certain range to the second vehicle through the communication device, and preferably sends a signal for moving the vehicle to the dispatch point to the vehicle-mounted device of the vehicle through the communication device.

A vehicle according to an embodiment of the present invention includes an operation device operated by a passenger; a vehicle-mounted device that, upon detecting that the operation device has been operated to request a stop, sends a stop request to a driving support apparatus, and receives a stop location, together with a stop command, from the driving support apparatus; and an automatic driving control module that moves the vehicle to the stop location, in response to the stop command received by the vehicle-mounted device.

A driving support system according to an embodiment of the present invention includes a vehicle-mounted device installed in a vehicle that is under automatic driving control, and a server connected to at least the vehicle-mounted device communicatable with each other through a network.

Upon receiving a stop request by a passenger who is riding in the vehicle from a mobile terminal of the passenger or the vehicle-mounted device of the vehicle, the server determines a stop location in accordance with the stop request, generates a driving route of the vehicle from the present location of the vehicle to the stop location, and calculates a stop time required to stop the vehicle at the stop location based on the driving route to the stop location. When the stop time is less than an allocated time for the stop request, the server sends a stop command for moving the vehicle to the stop location to the vehicle-mounted device of the vehicle. Upon receiving the stop command, the vehicle-mounted device moves the vehicle to the stop location.

A driving support method according to an embodiment of the present invention is carried out by a server having a communication device that is configured to be able to at least communicate with a vehicle-mounted device installed in a vehicle that is under automatic driving control. The method includes the steps of, upon receiving a stop request by a passenger who is riding in the vehicle from a mobile terminal of the passenger or the vehicle-mounted device of the vehicle through the communication device, determining a stop location in accordance with the stop request; generating a driving route of the vehicle from the present location of the vehicle to the stop location; and calculating a stop time required to stop the vehicle at the stop location based on the driving route to the stop location, and when the stop time is less than an allocated time for the stop request, sending a stop command for moving the vehicle to the stop location to the vehicle-mounted device of the vehicle through the communication device.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Figure 1:
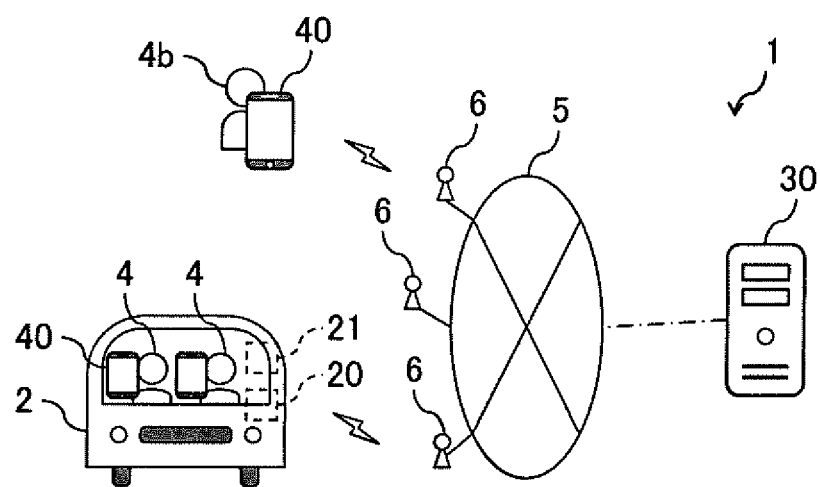
FIG. 1 is a drawing showing an example of the configuration of a driving support system according to a first embodiment.

A driving support apparatus according to the present invention includes a communication device that is configured to be able to at least communicate with a vehicle-mounted device installed in a vehicle that is under automatic driving control. Upon receiving a stop request by a passenger who is riding in the vehicle from a mobile terminal of the passenger or the vehicle-mounted device of the vehicle through the communication device, the driving support apparatus determines a stop location in accordance with the stop request, and generates a driving route of the vehicle from the present location of the vehicle to the stop location. When a stop time required to stop the vehicle at the stop location is less than an allocated time for the stop request, the driving support apparatus sends a stop command for moving the vehicle to the stop location to the vehicle-mounted device of the vehicle through the communication device.

Therefore, the driving support apparatus according to the present invention can appropriately determine whether or not to stop the vehicle that contains the passengers and is under automatic driving control, at the stop location.

Preferred embodiments of the present invention will be described below with reference to the drawings. Note that, the present invention is not limited to the following embodiments, but may be appropriately modified without departing from the gist thereof. In the drawings, components having the same or similar functions are assigned the same reference numerals, and descriptions thereof may be omitted or simplified.

First Embodiment

FIG. 1 is a drawing showing an example of the configuration of a driving support system 1 according to a first embodiment. The driving support system 1 according to the present embodiment includes a vehicle-mounted device 20, a server 30, and a mobile terminal 40. The vehicle-mounted device 20 and the server 30 are an example of the driving support apparatus.

The vehicle 2 illustrated in FIG. 1 is an automatic driving vehicle that offers mobility services such as taxi, bus, or ride sharing services. Passengers 4 using the mobility services ride in the vehicle 2. When the passenger 4 wishes to stop at a stop location, such as a bathroom, the passenger 4 sends a stop request of the vehicle 2 to the server 30 by operation of the mobile terminal 40, such as a cellular phone or a tablet computer.

Upon receiving a stop request of the vehicle 2, the server 30 sends a stop command for moving the vehicle 2 to a stop location to the vehicle-mounted device 20 of the vehicle 2.

The vehicle-mounted device 20 and an automatic driving control module 21 are installed in the vehicle 2. When the vehicle-mounted device 20 receives a stop command, the automatic driving control module 21 automatically controls the driving of the vehicle 2 to move the vehicle 2 to the stop location.

A user 4b who wishes to use the mobility service offered by the vehicle 2 can request the dispatch of the vehicle 2 from the server 30 by operating the mobile terminal 40.

The vehicle-mounted device 20, the server 30, and the mobile terminal 40 can communicate with each other through a network 5, which is composed of optical communication lines or the like. The server 30 is connected to the network 5 through, for example, a gateway or the like (not illustrated). The vehicle-mounted device 20 and the mobile terminal 40 are connected to the network 5 through, for example, wireless base stations 6 or the like.

Figure 2:
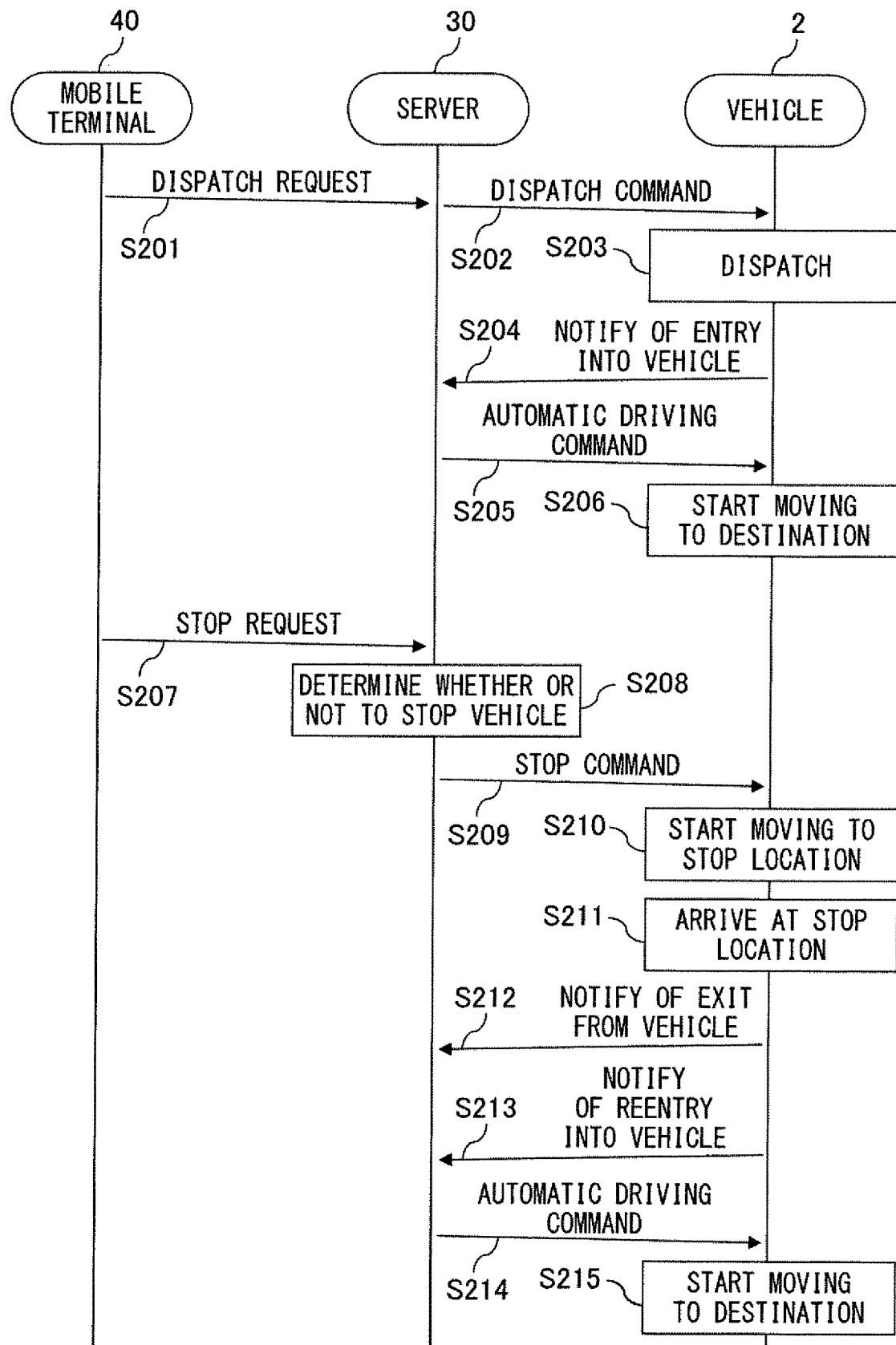
FIG. 2 is a sequence diagram showing an example of a stop process for stopping a vehicle at a stop location, in the driving support system according to the first embodiment.

FIG. 2 is a sequence diagram showing an example of a stop process for stopping the vehicle 2 at a stop location, in the driving support system 1 according to the first embodiment. In the sequence diagram of FIG. 2, the server 30, the vehicle 2, and the mobile terminal 40 communicate through the network 5.

The server 30 receives information regarding the identification information, present location, destination, target arrival time, and the like of the user 4b, together with a dispatch request, from the mobile terminal 40 carried by the user 4b who wishes to use the mobility service (step S201). The identification information of the user 4b is, for example, a user number assigned to the user 4b of the mobility service. The present location and destination of the user 4b are designated by, for example, facility names, addresses, or combinations of latitude and longitude.

The server 30 retrieves vehicles 2 that are present within a certain range from the present location of the user 4b, and selects an available vehicle 2 from the retrieved at least one vehicle 2. The server 30 sends a dispatch command to the vehicle 2 to move the vehicle 2 to the present location of the user 4b (step S202). Note that, when the vehicles 2 offer a ride sharing service or the like, other passengers 4 may already be riding in the vehicles 2. In this case, for example, the server 30 may select, from the retrieved at least one vehicle 2, a vehicle 2 containing other passengers 4 who are travelling to a destination that is in the same direction as the destination of the user 4b.

When the vehicle-mounted device 20 of the vehicle 2 receives the dispatch command from the server 30, the automatic driving control module 21 automatically controls the driving of the vehicle 2 to move the vehicle 2 to the present location of the user 4b, which is received together with the dispatch command (step S203).

When the user 4b enters the dispatched vehicle 2, the vehicle-mounted device 20 of the vehicle 2 detects the entry of the user 4b into the vehicle 2 by, for example, an in-vehicle camera or an opening and closing operation of a door of the vehicle 2, and informs the server 30 as such (step S204). The user 4b himself or herself, instead of the vehicle-mounted device 20 of the vehicle 2, may inform the server 30 of his or her entry into the vehicle 2 by operation of the mobile terminal 40.

Upon receiving confirmation that the user 4b has entered the vehicle 2, the server 30 generates a driving route from the present location of the vehicle 2 to the destination of the user 4b. Alternatively, for example, a car navigation system of the vehicle 2 may generate a driving route based on the information regarding the identification information, present location, destination, target arrival time, and the like of the user 4b, which is received together with the dispatch command. Note that, when the vehicle 2 offers ride sharing services, a driving route from the present location of the vehicle 2 to the nearest destination, from among the destination of the user 4b and the destinations of the other passengers 4 already riding in the vehicle 2, is generated.

The server 30 sends the driving route to the vehicle-mounted device 20 of the vehicle 2, as necessary, and commands the vehicle-mounted device 20 of the vehicle 2 to move the vehicle 2 along the driving route (step S205). The vehicle-mounted device 20 of the vehicle 2 makes the automatic driving control module 21 automatically control the driving of the vehicle 2 to move the vehicle 2 to the next destination along the driving route (step S206). While the automatic driving control module 21 is driving the vehicle 2 automatically, the vehicle 2 regularly sends position information representing the present location of the vehicle 2 to the server 30.

The user 4b who is riding in the vehicle 2 is hereinafter referred to as a passenger 4. When the passenger 4 who is riding in the vehicle 2 wishes to stop at a stop location, such as a bathroom, the passenger 4 sends a stop request to stop the vehicle 2 at the stop location to the server 30 by operation of, for example, the mobile terminal 40 (step S207). Alternatively, the passenger 4 may send a request to stop at a stop location by operation of, for example, a stop button provided in the vehicle 2, instead of the mobile terminal 40. The stop location may be, for example, a hospital, train station, rest area, convenience store, and the like, in addition to a bathroom.

The server 30 receives the stop request from the mobile terminal 40 of the passenger 4 or the vehicle 2. The stop request may include information regarding the stop location. The information regarding the stop location is designated by, for example, a facility name, an address, or a combination of latitude and longitude.

Next, the server 30 determines whether or not to stop the vehicle 2 at the stop location (step S208). When, for example, a stop time required to stop the vehicle 2 at the stop location is less than an allocated time (for example, 10 minutes) for the stop request, the server 30 stops the vehicle 2 at the stop location. For example, when there are no other passengers 4 in the vehicle 2, a longer time (for example, 1 hour) may be allocated.

When the server 30 has determined to stop the vehicle 2 at the stop location, the server 30 sends a stop command for moving the vehicle 2 to the stop location to the vehicle-mounted device 20 of the vehicle 2 (step S209). Note that, when the distance between the present location of the vehicle 2 and the destination of another passenger 4 is shorter than the distance between the present location of the vehicle 2 and the stop location, the server 30 may first move the vehicle 2 to the destination of the other passenger 4, and then move the vehicle 2 to the stop location. When the server 30 has determined not to stop the vehicle 2 at the stop location, the server 30 does not send the stop command to the vehicle-mounted device 20 of the vehicle 2, and informs the mobile terminal 40 of the passenger 4 that the vehicle 2 will not stop at the stop location.

Upon receiving the stop command, the vehicle-mounted device 20 of the vehicle 2 makes the automatic driving control module 21 automatically control the driving of the vehicle 2 to move the vehicle 2 to the stop location (step S210).

When the vehicle 2 arrives at the stop location (step S211) and the passenger 4 exits the vehicle 2, the vehicle-mounted device 20 of the vehicle 2 detects the exit of the user 4 by, for example, the in-vehicle camera or an opening and closing operation of the door of the vehicle 2, and informs the server 30 as such (step S212). The passenger 4 himself or herself, instead of the vehicle-mounted device 20 of the vehicle 2, may inform the server 30 of his or her exit from the vehicle 2 by operation of the mobile terminal 40. Thereafter, when the passenger 4 reenters the vehicle 2, the vehicle-mounted device 20 of the vehicle 2 detects the reentry of the passenger 4 into the vehicle 2, in the same manner, and informs the server 30 as such (step S213).

Upon receiving confirmation that the passenger 4 has reentered the vehicle 2, the server 30 generates a driving route of the vehicle 2 from the present location of the vehicle 2 to the next destination, an necessary, and commands the vehicle-mounted device 20 of the vehicle 2 to move the vehicle 2 along the driving route (step S214). The vehicle-mounted device 20 of the vehicle 2 makes the automatic driving control module 21 automatically control the driving of the vehicle 2, to move the vehicle 2 to the destination along the driving route (step S215).

Figure 3:
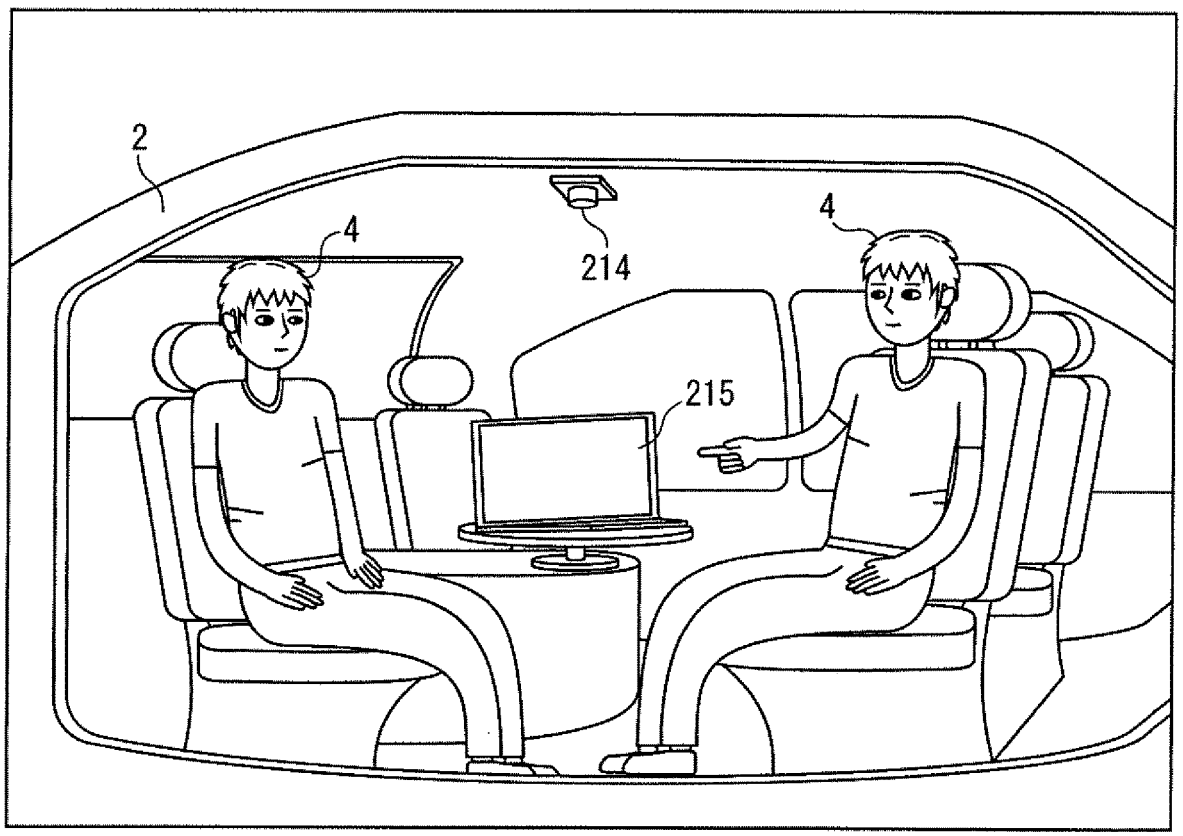
FIG. 3 is a drawing showing an example of a compartment of the vehicle according to the first embodiment.

FIG. 3 is a drawing showing an example of a compartment of the vehicle 2 according to the first embodiment. In FIG. 3, a plurality of passengers 4 using a mobility service offered by the vehicle 2 are sitting in seats arranged in the compartment of the vehicle 2.

A stop button 214 to stop the vehicle 2 at a stop location, such as a bathroom, is provided on the ceiling of the compartment of the vehicle 2. The function of the stop button 214 is labeled as, for example, "bathroom stop button". Therefore, the passengers 4 can operate the stop button 214 to stop the vehicle 2 at the stop location, such as a bathroom.

For example, a touch display 215 is installed in the center of the passenger compartment of the vehicle 2. Guidance on the stop button 214, such as, for example, "if you wish to stop at a bathroom, please operate the bathroom stop button on the ceiling" is regularly displayed on the touch display 215.

The stop button 214 may be an operation button for stopping the vehicle 2 at another facility such as, for example, a hospital, a train station, a rest area, or a convenience store, instead of a bathroom. The vehicle 2 may be provided with a plurality of stop buttons 214 to stop the vehicle 2 at different facilities. The stop button 214 may be configured such that the type of facility at which the vehicle 2 will stop can be set by, for example, operation of the touch display 215.

The stop button 214 may include operation buttons displayed on the touch display 215 or the mobile terminals 40 of the passengers 4, in addition to the physical operation button provided in the vehicle 2, as illustrated in FIG. 3. However, at least one physical stop button 214 is preferably provided in the compartment of the vehicle 2. Therefore, for example, when the passenger 4 urgently needs to use a bathroom, is sick, or is a child who cannot operate the touch display 215, or the like, the passenger 4 can quickly stand up and intuitively operate the stop button 214.

Figure 4:
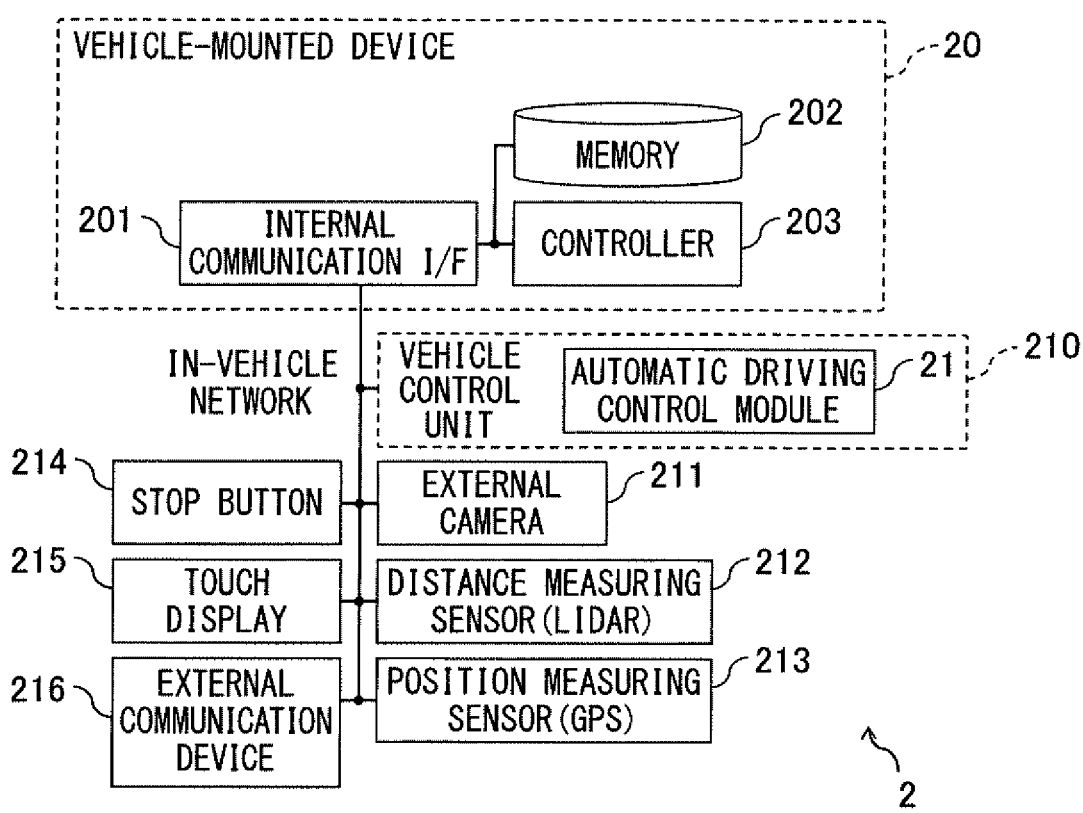
FIG. 4 is a hardware configuration diagram of the vehicle according to the first embodiment.

FIG. 4 is a hardware configuration diagram of the vehicle 2 according to the first embodiment. The vehicle 2 includes the vehicle-mounted device 20, a vehicle control unit 210, an external camera 211, a distance measuring sensor 212, a position measuring sensor 213, the stop button 214, the touch display 215, and an external communication device 216 that are connected to each other through an in-vehicle network. The vehicle 2 further includes the automatic driving control module 21. The in-vehicle network is, for example, a network that is in conformity with CAN (controller area network).

The vehicle-mounted device 20 receives a stop command for moving the vehicle 2 to a stop location, and makes the automatic driving control module 21 automatically control the driving of the vehicle 2 to move the vehicle 2 to the stop location. The vehicle-mounted device 20 includes an internal communication interface (I/F) 201, a memory 202, and a controller 203 that are connected to each other through signal lines.

The internal communication I/F 201 is a communication I/F circuit through which the vehicle-mounted device 20 communicates with other vehicle-mounted devices of the vehicle 2 via the in-vehicle network.

The memory 202 includes a recording medium such as an HDD (hard disk drive), an optical recording medium, or a semiconductor memory, and stores computer programs executed by the controller 203. The memory 202 stores data generated by the controller 203, data received by the controller 203 from the other vehicle-mounted devices of the vehicle 2 through the in-vehicle network, and the like. The memory 202 also stores information regarding the identification information, present location, destination, target arrival time, and the like of the passenger 4 received by the server 30, and information regarding a driving route of the vehicle 2 generated by the server 30 or the car navigation system of the vehicle 2. The memory 202 stores the type, version, or the like of the automatic driving control module 21 of the vehicle 2, as an example of information regarding the vehicle 2. The memory 202 stores information such as the address of the passenger 4, as an example of information regarding the passenger 4, in association with the identification information of the passenger 4. The memory 202 may store data including a guidance display style, a button image, and the like to be displayed on the mobile terminal 40 or the touch display 215 of the vehicle 2.

The controller 203 is one or more processors and peripheral circuits thereof that execute computer programs for control and calculation in the vehicle-mounted device 20. The controller 203 may be embodied as an FPGA (field programmable gate array), an ASIC (application specific integrated circuit), or the like.

The controller 203 obtains position information representing the present location of the vehicle 2 from the position measuring sensor 213, which is described later, through the internal communication I/F 201, and regularly sends the obtained position information to the server 30 through the external communication device 216.

Upon receiving a signal indicating that the passenger 4 has operated the stop button 214, from the stop button 214 through the internal communication I/F 201, the controller 203 sends a stop request to the server 30 through the external communication device 216. The stop request includes the type of facility, for example, "bathroom", "hospital", or the like associated with the signal outputted from the stop button 214, as information regarding a stop location.

The controller 203 reads, from the memory 202, and displays a map of the area of the present location of the vehicle 2 on the touch display 215, and may display candidate facilities of a stop location on the map. Upon receiving a signal indicating that the passenger 4 has touched the candidate facility displayed on the touch display 215, from the touch display 215 through the internal communication I/F 201, the controller 203 may send a stop request to the server 30 in the same manner. In this case, the stop request includes the address or a combination of the latitude and longitude of the candidate facility of the stop location touched by the passenger 4 as information regarding the stop location.

Upon receiving a stop command from the server 30 through the external communication device 216, the controller 203 makes the automatic driving control module 21, which is described later, automatically control the driving of the vehicle 2 to move the vehicle 2 to a stop location. The stop command may include information regarding a driving route of the vehicle 2 generated by the server 30 and the like, in addition to information regarding the stop location, as with the stop request.

The automatic driving control module 21 includes one or more processors and peripheral circuits thereof, an FPGA, an ASIC, or the like that execute computer programs for automatic driving control of the vehicle 2. The automatic driving control module 21 includes a recording medium such as a semiconductor memory for storing computer programs executed by the automatic driving control module 21, data to be processed by the automatic driving control module 21, and the like.

The automatic driving control module 21 automatically controls the driving of the vehicle 2. For example, the automatic driving control module 21 determines a steering angle of the vehicle 2 for determining the course of the vehicle 2, so that the vehicle 2 drives along a driving route. The automatic driving control module 21 calculates a target speed of the vehicle 2, so that the vehicle 2 arrives at a destination prior to the target arrival time. The automatic driving control module 21 calculates an acceleration position or a braking amount, such that the current speed of the vehicle 2 measured by a speed sensor (not illustrated) coincides with the target speed.

The vehicle control unit 210 is, for example, an electronic control unit (ECU) of the vehicle 2. The vehicle control unit 210 includes one or more processors and peripheral circuits thereof, an FPGA, an ASIC, or the like that execute computer programs for performing control of the vehicle 2. The vehicle control unit 210 includes a recording medium such as a semiconductor memory for storing computer programs executed by the vehicle control unit 210, data to be processed by the vehicle control unit 210, and the like.

The vehicle control unit 210 includes at least one automatic driving control module 21, and outputs a control signal corresponding to the steering angle of the vehicle 2 calculated by the automatic driving control module 21 to an actuator (not illustrated) for controlling the steering wheel of the vehicle 2. The vehicle control unit 210 calculates a fuel injection amount in accordance with an acceleration position calculated by the automatic driving control module 21, and outputs a control signal corresponding to the fuel injection amount to a fuel injection device of the engine of the vehicle 2. Alternatively, the vehicle control unit 210 outputs a control signal corresponding to a braking amount calculated by the automatic driving control module 21 to a brake of the vehicle 2. The vehicle control unit 210 transmits signals outputted from the external camera 211, the distance measuring sensor 212, and the position measuring sensor 213, which are described later, to the automatic driving control module 21.

The external camera 211 captures and generates a video of objects and people around the vehicle 2, and outputs the video. The video of the objects and people captured by the external camera 211 are used by the automatic driving control module 21 to automatically control the driving of the vehicle 2. The external camera 211 is disposed near a windshield of the vehicle 2, for example, with an imaging surface thereof facing toward the outside such that the objects and the people around the vehicle 2 are captured clearly.

The distance measuring sensor 212 measures and outputs distances to objects that are present ahead of the vehicle 2 on an orientation basis. Distance measurement values obtained by the distance measuring sensor 212 are used, in the same manner, by the automatic driving control module 21 to automatically control the driving of the vehicle 2. The distance measuring sensor 212 is, for example, a LIDAR (light detection and ranging) sensor installed in the vehicle 2.

The position measuring sensor 213 generates position information that represents the present location of the vehicle 2, and outputs the position information to the vehicle-mounted device 20. The position information generated by the position measuring sensor 213 is used by the automatic driving control module 21 to automatically control the driving of the vehicle 2, and is also regularly sent to the server 30 through the network 5 so that the server 30 can understand the present location of the vehicle 2. The position measuring sensor 213 is, for example, a GPS (global positioning system) of the car navigation system installed in the vehicle 2.

The stop button 214, which is an example of the operation device, outputs a signal indicating that the stop button 214 has been operated by the passenger 4 who is riding in the vehicle 2, to the vehicle-mounted device 20. The stop button 214 is, for example, a physical operation button provided in the vehicle 2, as illustrated in FIG. 3. A plurality of stop buttons 214 may be provided in the vehicle 2. The stop button 214 is disposed, for example, around the seats of the vehicle 2, on the ceiling of the compartment of the vehicle 2, or the like such that the passengers 4 who are sitting in the seats of the vehicle 2 can reach the stop button 214.

The touch display 215 is controlled by the vehicle-mounted device 20, and displays guidance for the passengers 4 riding in the vehicle 2. For example, when the vehicle 2 moves to a stop location, guidance of "this vehicle will stop at a bathroom in response to a passenger's request" and the like is displayed on the touch display 215. As described above, while the automatic driving control module 21 automatically controls the driving of the vehicle 2, guidance of "if you wish to stop at a bathroom, please operate the bathroom stop button on the ceiling" and the like is displayed on the touch display 215. Instead of the touch display 215, a speaker for announcing the same guidance to the interior of the vehicle, under the control of the vehicle-mounted device 20, or the like may be used.

As described above, the stop button 214 may be displayed on the touch display 215. In this case, the touch display 215 is another example of the operation device, and outputs a signal indicating that the stop button 214 displayed on the touch display 215 has been operated by the passenger 4, to the vehicle-mounted device 20 through the internal communication I/F 201.

As described above, candidate facilities of the stop location may be displayed on the touch display 215, together with a map of the area of the present location of the vehicle 2. The touch display 215 outputs the coordinates of the candidate facility touched by the passenger 4, on the touch display 215, to the vehicle-mounted device 20 through the internal communication I/F 201. The controller 203 sends an address on the map or a combination of latitude and longitude corresponding to the coordinates of the candidate facility on the touch display 215 touched by the passenger 4, as information regarding the stop location. Therefore, the passenger 4 can designate the desired stop location by touching the candidate facility on the map displayed on the touch display 215.

The external communication device 216 is an in-vehicle terminal having a wireless communication function, and is, for example, an in-vehicle navigation system of a DCM (data communication device), as described in the non-patent literature (TOYOTA MOTOR CORPORATION, Mobility Service-specific EV "e-Palette Concept" [retrieved on Aug. 31, 2018], Internet <URL: https://newsroom.toyota.co.jp/jp/corporate/20508200.html>). The external communication device 216 is connected to the network 5 through the wireless base station 6, for example, by access to the wireless base station 6, which is connected to the network 5 through a gateway (not illustrated) and the like. The external communication device 216 may be configured such that the mobile terminals 40 of the passengers 4 can directly communicate with the vehicle-mounted device 20 of the vehicle 2 using near-field wireless communication such as, for example, Bluetooth (trademark).

Figure 5:
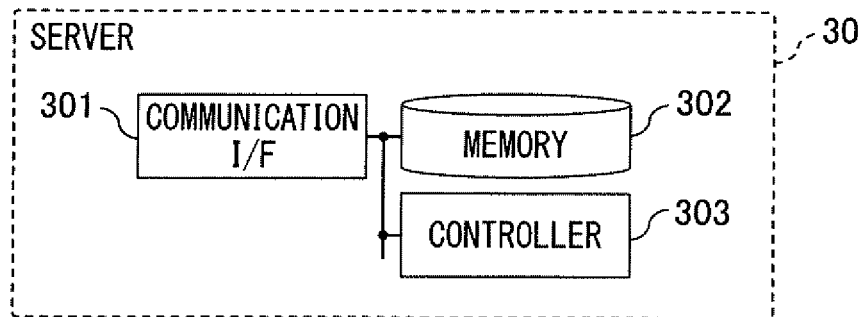
FIG. 5 is a hardware configuration diagram of a server according to the first embodiment.

FIG. 5 is a hardware configuration diagram of the server 30 according to the first embodiment. The server 30 includes a communication I/F 301, a memory 302, and a controller 303 that are connected to each other through signal lines.

The communication I/F 301, which is an example of the communication device, is a communication I/F circuit for connecting the server 30 to the network 5 through, for example, a gateway or the like. The communication I/F 301 is configured to be able to communicate with the vehicle-mounted device 20 of the vehicle 2 and the mobile terminals 40 through the network 5.

The memory 302 includes a recording medium such as an HDD (hard disk drive), an optical recording medium, or a semiconductor memory, and stores computer programs executed by the controller 303. The memory 302 stores data generated by the controller 303, data received by the controller 303 through the network 5, and the like. The memory 302 stores information regarding the identification information, present location, destination, stop location, target arrival time, and the like of the passenger 4, which is received from the mobile terminal 40. The memory 302 stores information regarding a driving route of the vehicle 2 generated by a driving route generator 305, which is described later, of the controller 303 or the car navigation system of the vehicle 2, and map data that is referred to by the driving route generator 305 to generate the driving route of the vehicle 2. The memory 302 stores the type, version, or the like of the automatic driving control module 21 of the vehicle 2, as an example of information regarding the vehicle 2. The memory 302 stores information regarding the address and the like of the passenger 4, as an example of information regarding the passenger 4, in association with the identification information of the passenger 4. The memory 302 may store data including a guidance display style, a button image, and the like to be displayed on the mobile terminal 40 or the touch display 215 of the vehicle 2.

Figure 6:
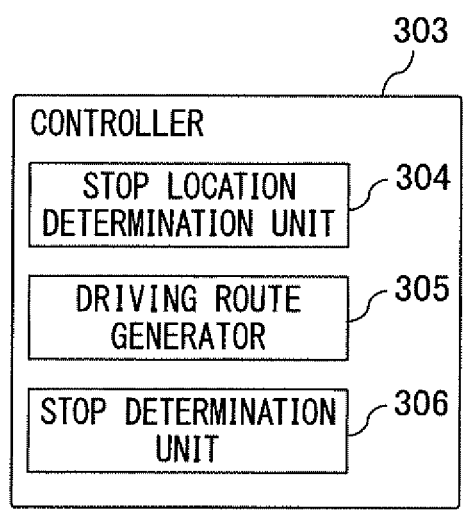
FIG. 6 is a functional block diagram of a controller of the server according to the first embodiment.

FIG. 6 is a functional block diagram of the controller 303 of the server 30 according to the first embodiment. The controller 303 is one or more processors and peripheral circuits thereof that execute computer programs for control and calculation in the server 30. The controller 303 may be embodied as an FPGA, an ASIC, or the like.

The controller 303 includes a stop location determination unit 304, the driving route generator 305, and a stop determination unit 306. The stop location determination unit 304, the driving route generator 305, and the stop determination unit 306 are realized as, for example, software modules or firmware embodied by computer programs executed on a processor. The stop location determination unit 304, the driving route generator 305, and the stop determination unit 306 may be embodied as an arithmetic circuit formed in an FPGA or an ASIC. Processes performed by the stop location determination unit 304, the driving route generator 305, and the stop determination unit 306 will be described later in detail with reference to the flowcharts of FIGS. 8 and 10, and thus, the descriptions thereof have been simplified.

Upon receiving a stop request by the passenger 4 who is riding in the vehicle 2 from the mobile terminal 40 of the passenger 4 or the vehicle-mounted device 20 of the vehicle 2 through the communication I/F 301, the stop location determination unit 304 determines a stop location in accordance with the stop request.

The driving route generator 305 generates a driving route of the vehicle 2 from the present location of the vehicle 2 to the stop location.

The stop determination unit 306 calculates a stop time required to stop the vehicle 2 at the stop location, based on a driving route to the stop location. When the stop time is less than an allocated time for the stop request, the stop determination unit 306 sends a stop command for moving the vehicle 2 to the stop location to the vehicle-mounted device 20 of the vehicle 2 through the communication I/F 301.

Figure 7:
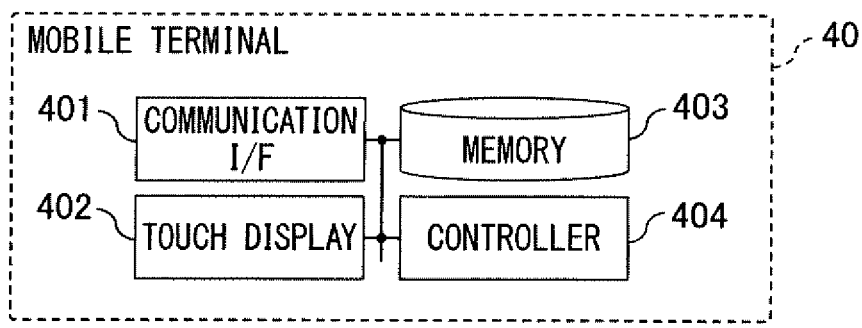
FIG. 7 is a hardware configuration diagram of a mobile terminal according to the first embodiment.

FIG. 7 is a hardware configuration diagram of the mobile terminal 40 according to the first embodiment. The mobile terminal 40 includes a communication I/F 401, a touch display 402, a memory 403, and a controller 404 that are connected to each other through signal lines.

The communication I/F 401 is a communication I/F circuit through which the mobile terminal 40 is connected to the network 5 through, for example, a gateway or the like. The communication I/F 401 is configured to be able to communicate with the server 30 through the network 5. The communication I/F 401 may be configured such that the mobile terminal 40 of the passenger 4 can directly communicate with the vehicle-mounted device 20 of the vehicle 2 using near-field wireless communication such as, for example, Bluetooth (trademark).

Guidance, operation buttons, and the like are displayed on the touch display 402 in accordance with signals sent from the server 30. The passenger 4 of the vehicle 2 can send a response to the guidance displayed on the touch display 402, by operation of the buttons displayed on the touch display 402. Specific examples of the guidance and the operation buttons will be described later with reference to FIGS. 9 and 11.

The memory 403 includes a recording medium such as an HDD (hard disk drive), an optical recording medium, or a semiconductor memory, and stores computer programs executed by the controller 404. The memory 403 stores data generated by the controller 404, data received by the controller 404 through the network 5, and the like. The memory 403 may store data including a guidance display style, a button image, and the like to be displayed on the mobile terminal 40 or the touch display 215 of the vehicle 2. The memory 403 may store map data, which is described later, to be displayed on the touch display 215.

The controller 404 is one or more processors and peripheral circuits thereof that execute computer programs for control and calculation in the mobile terminal 40. The controller 404 may be embodied as an FPGA, an ASIC, or the like.

Upon receiving a signal indicating that a stop button displayed on the touch display 402 has been operated by the passenger 4, the controller 404 sends a stop request to the server 30 through the communication I/F 401. The stop request includes the type of facility, for example, "bathroom", "hospital", or the like associated with the signal outputted from the stop button, as information regarding a stop location.

The controller 404 reads, from the memory 403, and displays a map of the area of the present location of the vehicle 2 on the touch display 402, and the controller 404 may display candidate facilities of the stop location on the map. Upon receiving a signal indicating that the candidate facility displayed on the touch display 402 has been touched by the passenger 4 from the touch display 402, the controller 404 may send a stop request to the server 30 in the same manner. In this case, the stop request includes the address or a combination of the latitude and longitude of the candidate facility of the stop location touched by the passenger 4, as information regarding the stop location.

Figure 8:
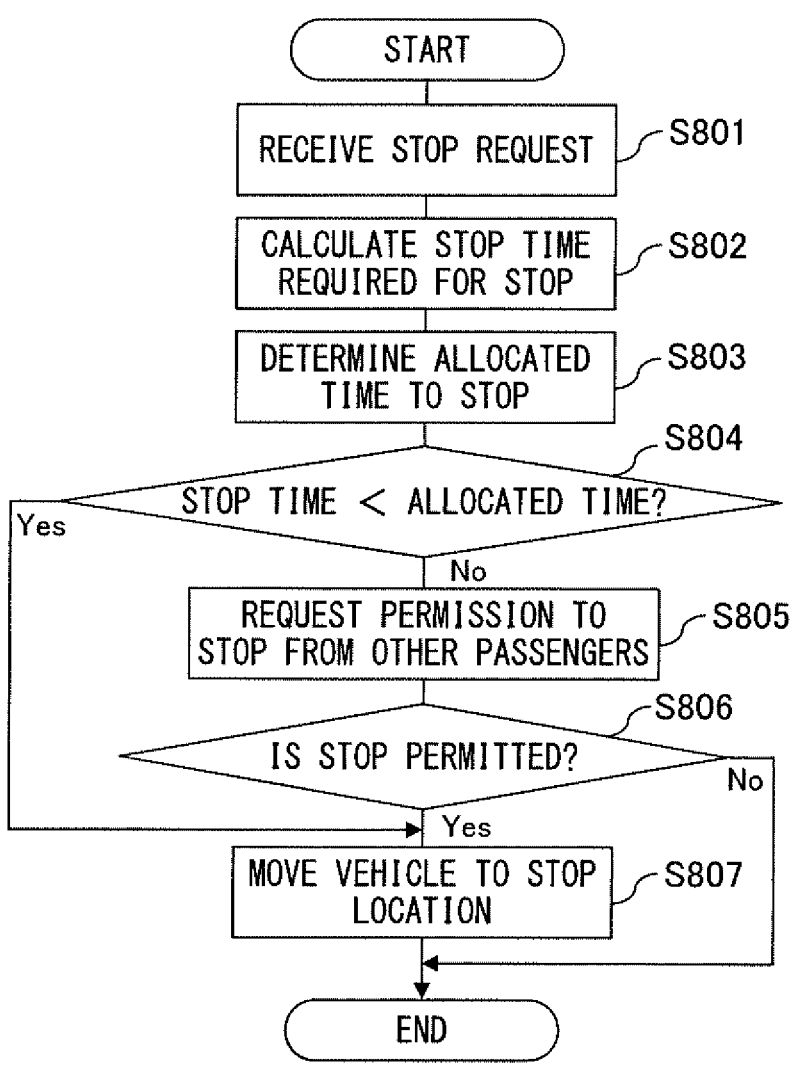
FIG. 8 is a flowchart showing an example of the stop process for stopping the vehicle at the stop location, in the server according to the first embodiment.

FIG. 8 is a flowchart showing an example of a stop process for stopping the vehicle 2 at a stop location, in the server 30 according to the first embodiment. The stop location determination unit 304, the driving route generator 305, and the stop determination unit 306 of the server 30 carry out the stop process in accordance with the following flowchart. Descriptions regarding contents that are the same as the sequence diagram of FIG. 2 have been omitted.

Upon receiving a stop request of the vehicle 2 from the mobile terminal 40 of the passenger 4 or the vehicle-mounted device 20 of the vehicle 2 through the communication I/F 301 (step S801), the stop location determination unit 304 determines a stop location in accordance with the stop request. More specifically, when information regarding the stop location included in the stop request is designated by an address or a combination of latitude and longitude, the stop location determination unit 304 determines the designated address or the combination of latitude and longitude as the stop location.

When the information regarding the stop location is designated by the type of facility, e.g., "bathroom", the stop location determination unit 304 refers to map data stored in the memory 302, and retrieves candidate facilities of the designated type along the driving route from the present location of the vehicle 2 to the next destination. When one or more candidate facilities along the driving route from the present location of the vehicle 2 to the next destination are retrieved, the stop location determination unit 304 determines the retrieved candidate facility nearest to the present location of the vehicle 2 as the stop location. Conversely, when no candidate facilities along the driving route from the present location of the vehicle 2 to the next destination are retrieved, the stop location determination unit 304 determines the facility nearest to the present location of the vehicle 2 as the stop location.

Alternatively, the stop location determination unit 304 may retrieve both of a candidate facility (first candidate facility) along the driving route to the next destination and a candidate facility (second candidate facility) that is the nearest to the present location of the vehicle 2. In this case, for example, when the distance to the first candidate facility is less than a predetermined multiple (for example, twice) of the distance to the second candidate facility, the stop location determination unit 304 determines the first candidate facility as the stop location. Otherwise, the stop location determination unit 304 determines the second candidate facility as the stop location. Therefore, the passenger 4 can earlier stop at the stop location.

Next, the driving route generator 305 generates a driving route from the present location of the vehicle 2 to the stop location determined by the stop location determination unit 304 by a route finding algorithm using, for example, the Dijkstra method.

The stop determination unit 306 calculates a stop time required for stopping the vehicle 2 at the stop location, based on the generated driving route (step S802). The stop time includes a waiting time of the vehicle 2 for keeping the vehicle 2 at the stop location until the passenger 4 reenters the vehicle 2, in addition to a moving time for moving the vehicle 2 to the stop location.

When the stop button 214 is, for example, a button to stop at a hospital, the passenger 4 who has operated the stop button 214 is likely to be a sick person whose physical condition has suddenly deteriorated. The passenger 4 who has stopped at the hospital is not likely to return to the vehicle 2. When the stop location is the type of facility at which the passenger 4 is unlikely to return to the vehicle 2, the stop determination unit 306 may not include a waiting time in the stop time. The types of facilities at which the passenger 4 is unlikely to return to the vehicle 2 are stored in advance in the memory 302 of the server 30.

Next, the stop determination unit 306 determines an allocated time allocated for the stop request as, for example, a predetermined length of time (for example, 10 minutes) (step S803). The stop determination unit 306 may determine the allocated time based on information regarding the destination, target arrival time, and the like of the passenger 4 stored in advance in the memory 302.

More specifically, the driving route generator 305 generates a second driving route for moving the vehicle 2 from the present location to the stop location, and thereafter moving the vehicle 2 sequentially to the destinations of the individual passengers 4. The stop determination unit 306 calculates the expected arrival times of the other passengers 4 at which the vehicle 2 is expected to sequentially arrive at the destinations of the other passengers 4, after the vehicle 2 has stopped at the stop location. The stop determination unit 306 calculates a margin time between the expected arrival time and the target arrival time of each passenger 4, and determines a minimum value of the margin times as the allocated time. In this case, the allocated time may sometimes be zero. Therefore, the allocated time is determined so as not to affect the target arrival times of the other passengers 4 riding in the vehicle 2.

Furthermore, when a dispatch request is received from another passenger 4, the stop determination unit 306 may subtract a dispatch time required for moving the vehicle 2 to the dispatch point of the passenger 4, based on a driving route to the dispatch point at which the passenger 4 is waiting, from the margin time, as necessary.

The stop determination unit 306 determines whether or not the stop time required for stopping the vehicle 2 at the stop location is less than the allocated time (step S804).

When the stop time is equal to or greater than the allocated time (NO in step S804), the stop determination unit 306 requests permission to stop the vehicle 2 at the stop location from the other passengers 4 riding in the vehicle 2 (step S805). More specifically, as shown in, for example, FIG. 9, which is described later, the stop determination unit 306 sends a signal for displaying a query requesting permission to stop the vehicle 2 on the touch displays 402 of the mobile terminals 40 of the other passengers 4, to the mobile terminals 40 of the other passengers 4 through the communication I/F 301. Alternatively, the stop determination unit 306 may send a signal for displaying a query requesting permission to stop the vehicle 2 on the touch display 215 of the vehicle 2, to the vehicle-mounted device 20 through the communication I/F 301.

Note that, the stop determination unit 306 may request permission to stop the vehicle 2 from only passengers 4 whose margin time between the expected arrival time and the target arrival time is less than the stop time. The stop determination unit 306 may request permission to stop the vehicle 2 from the other passengers 4 in only cases of stop requests at facilities having high degree of urgency, such as a bathroom or a hospital.

Next, the stop determination unit 306 determines whether or not the other passengers 4, from whom permission to stop the vehicle 2 has been requested, have given permission to stop the vehicle 2 within a predetermined time (for example, within 2 minutes) (step S806). When not all the other passengers 4, from whom permission has been requested, have given permission (NO in step S806), the stop determination unit 306 does not send a stop command to the vehicle-mounted device 20, and informs the passenger 4 with the mobile terminal 40 that the vehicle 2 will not stop. In this case, for example, the server 30 may dispatch another second vehicle. The server 30 may transfer the passenger 4 to the second vehicle, and stop the second vehicle at the stop location.

More specifically, the stop determination unit 306 retrieves a second vehicle that is present within a certain distance from the present location of the vehicle 2. The stop determination unit 306 sends a signal for dispatching the retrieved second vehicle to a dispatch point within a certain range to the second vehicle through the communication I/F 301, and sends a signal for moving the vehicle 2 to the dispatch point to the vehicle 2 through the communication I/F 301. Therefore, the passenger 4 can transfer to the second vehicle and stop at the stop location.

Conversely, when the stop time is less than the allocated time (YES in step S804) or all the other passengers 4, from whom permission has been requested, have given permission (YES in step S806), the stop determination unit 306 sends a stop command to the vehicle-mounted device 20 through the communication I/F 301 to move the vehicle 2 to the stop location (step S807). The stop determination unit 306 then ends the stop process. Therefore, the passenger 4 can stop at the stop location.

Figure 9:
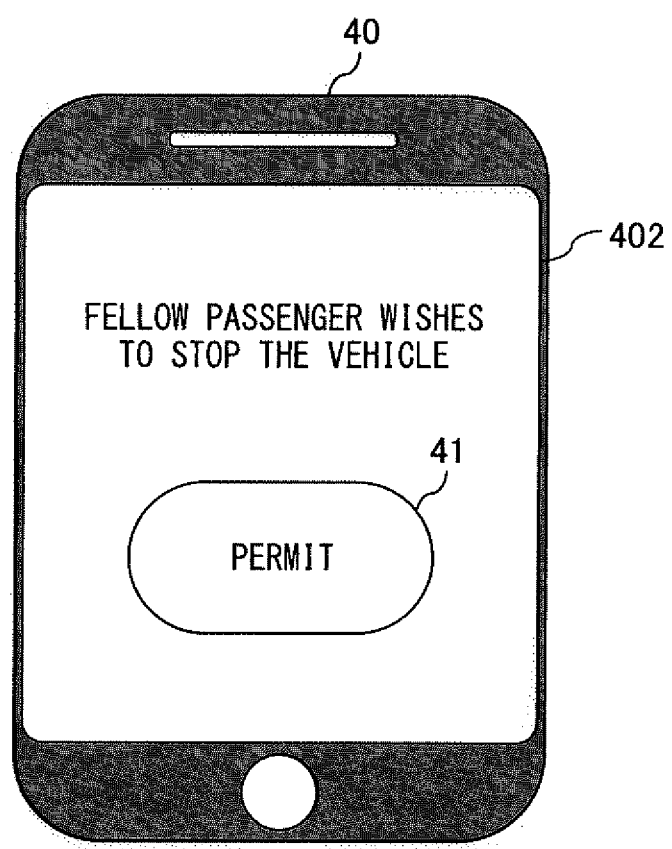
FIG. 9 is a drawing showing an example of a stop permission button displayed on the mobile terminal according to the first embodiment.

FIG. 9 is a drawing showing an example of a stop permission button 41 displayed on the mobile terminal 40 according to the first embodiment. The stop permission button 41 illustrated in FIG. 9 is displayed on, for example, the touch displays 402 of the mobile terminals 40, in accordance with a signal sent from the server 30. Each of the other passengers 4 riding in the vehicle 2 can reply to a query requesting permission to stop the vehicle 2, displayed on the touch display 402 of the mobile terminal 40, by operation of the stop permission button 41 displayed on the touch display 402 of the mobile terminal 40.

The signal that is sent from the server 30 to display the stop permission button 41 may include information regarding a guidance display style for displaying the query requesting permission to stop the vehicle 2 on the touch display 215 of the mobile terminal 40, an image of the stop permission button 41, and the like. The information regarding the guidance display style, the image of the stop permission button 41, and the like may be stored in advance in the memory 403 of the mobile terminal 40. In this case, upon receiving the signal for displaying the stop permission button 41 from the server 30, the mobile terminal 40 reads the guidance display style and the image of the stop permission button 41 from the memory 403, and displays the stop permission button 41 on the touch display 402.

The guidance for the query requesting permission to stop the vehicle 2 and the stop permission button 41 may be displayed on the touch display 215 of the vehicle 2, instead of on the touch display 402 of the mobile terminal 40. The other passengers 4 riding in the vehicle 2 can reply to the query requesting permission to stop the vehicle 2 displayed on the touch display 215 of the vehicle 2, by operation of the stop permission button 41 displayed on the touch display 215 of the vehicle 2.

Figure 10:
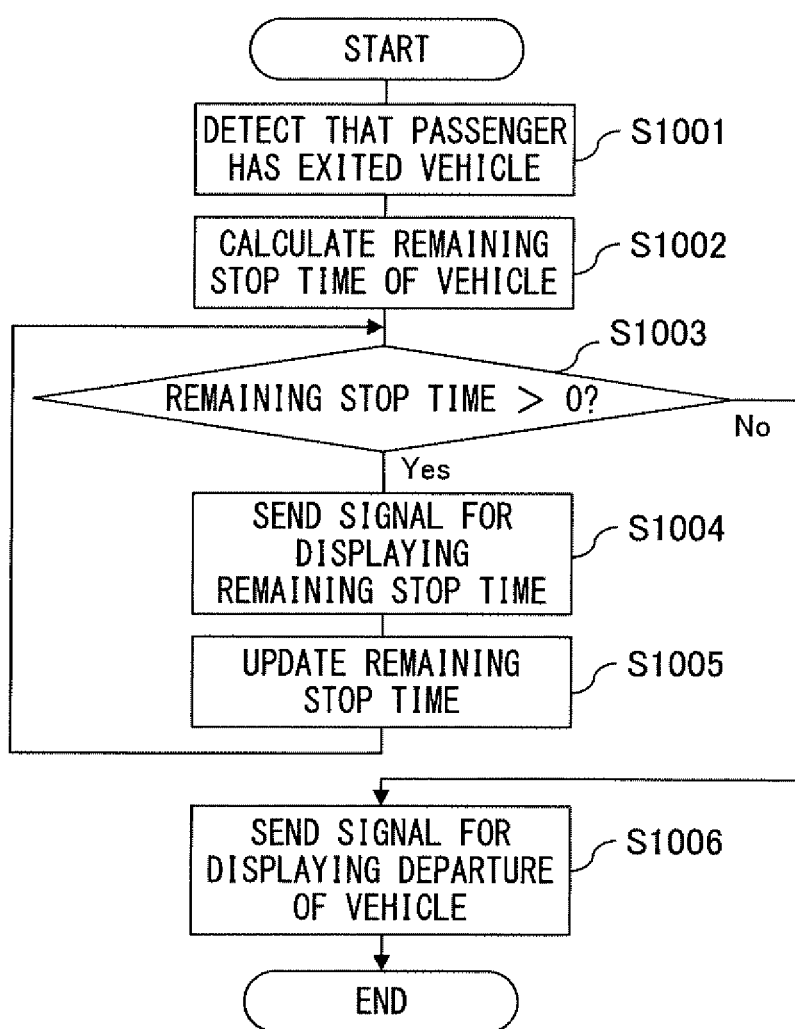
FIG. 10 is a flowchart showing an example of a remaining stop time display process for displaying a remaining stop time of the vehicle on the mobile terminal, in the server according to the first embodiment.

FIG. 10 is a flowchart showing an example of a remaining stop time display process for displaying a remaining stop time of the vehicle 2 on the mobile terminal 40, in the server 30 according to the first embodiment. The stop determination unit 306 of the server 30 carries out the remaining stop time display process in accordance with the following flowchart.

When the stop determination unit 306 detects that the passenger 4 has exited the vehicle 2 by, for example, a notification from the vehicle 2 or the mobile terminal 40 (step S1001), the stop determination unit 306 calculates an initial value of a remaining stop time of the vehicle 2 (step S1002). The initial value of the remaining stop time is, for example, a time obtained by subtracting a moving time required to move the vehicle 2 to the stop location from an allocated time for the stop request, as described above. When the allocated time is calculated based on information regarding the destination, the target arrival time, and the like of the passenger 4, the initial value of the remaining stop time may be zero.

The stop determination unit 306 determines whether or not the remaining stop time of the vehicle 2 is greater than zero (step S1003). When the remaining stop time of the vehicle 2 is greater than zero (YES in step S1003), the stop determination unit 306 sends a signal to display the remaining stop time of the vehicle 2 as shown in, for example, FIG. 11, which is described later, to the mobile terminal 40 through the communication I/F 301 (step S1004). This signal may be sent in a data format of, for example, HTML (hypertext markup language) or the like including information regarding a display style of the remaining stop time. Therefore, the remaining stop time of the vehicle 2 is displayed on the mobile terminal 40 of the passenger 4.

The stop determination unit 306 updates the value of the remaining stop time of the vehicle 2 (step S1005). The value of the remaining stop time is a value which, for example, counts down from the initial value of the remaining stop time in accordance with a lapse of time from the time when the passenger 4 exited the vehicle 2. While the remaining stop time of the vehicle 2 is greater than zero, the stop determination unit 306 repeats steps S1003 to S1005 at certain control intervals. The mobile terminal 40, instead of the stop determination unit 306, may perform the steps for updating and displaying the remaining stop time of the vehicle 2.

Conversely, when the remaining stop time of the vehicle 2 is zero (NO in step S1003), the stop determination unit 306 starts moving the vehicle 2 to the next destination, and sends a signal to display guidance for notifying the departure of the vehicle 2, to the mobile terminal 40 (step S1006). Therefore, the passenger 4 can be notified of the departure of the vehicle 2.

Figure 11:
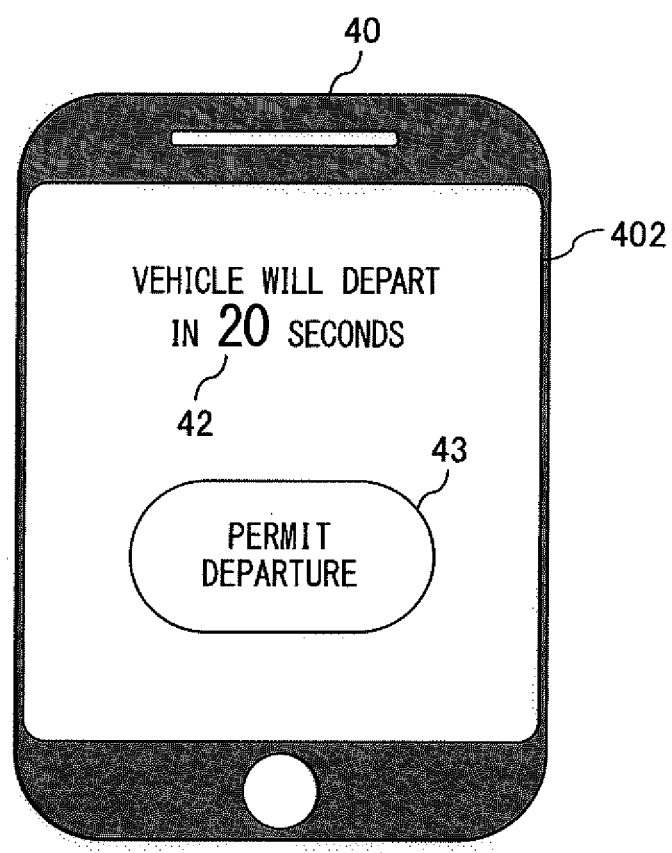
FIG. 11 is a drawing showing an example of a remaining stop time of the vehicle displayed on the mobile terminal according to the first embodiment.

FIG. 11 is a drawing showing an example of a remaining stop time 42 of the vehicle 2 displayed on the mobile terminal 40 according to the first embodiment. In FIG. 11, the remaining stop time 42 of the vehicle 2 is displayed on, for example, the touch display 402 of the mobile terminal 40 in accordance with a signal sent from the server 30. Therefore, the passenger 4 who has exited the vehicle 2 can check the remaining stop time 42 of the vehicle 2 on the touch display 402 of the mobile terminal 40, while he or she is stopped at the stop location.

In FIG. 11, a departure permission button 43 for sending a signal to give permission to start moving the vehicle 2 before the remaining stop time 42 of the vehicle 2 becomes zero to the server 30 is displayed under the remaining stop time 42 of the vehicle 2. The departure permission button 43 is also displayed in accordance with the signal sent from the server 30. When the passenger 4 has decided not to return to the vehicle 2 or has recognized that he or she cannot return to the vehicle 2, the passenger 4 can start the vehicle 2 by operating the departure permission button 43, whereby the vehicle 2 can move to the next destination sooner.

The signal, sent from the server 30, for displaying the remaining stop time 42 of the vehicle 2 may include information regarding a display style of the remaining stop time 42, an image of the departure permission button 43, and the like, as with the signal for displaying the stop permission button 41.

As described above, the driving support apparatus according to the present embodiment includes a communication device that is configured to be able to at least communicate with the vehicle-mounted device installed in the vehicle that is under automatic driving control. Upon receiving a stop request by the passenger who is riding in the vehicle from the mobile terminal of the passenger or the vehicle-mounted device of the vehicle through the communication I/F, the driving support apparatus determines a stop location in accordance with the stop request, and generates a driving route of the vehicle from the present location of the vehicle to the stop location. When a stop time required to stop the vehicle at the stop location is less than an allocated time for the stop request, the driving support apparatus sends a stop command for moving the vehicle to the stop location to the vehicle-mounted device of the vehicle through the communication device.

Therefore, the driving support apparatus according to the present embodiment can appropriately determine whether or not to stop the vehicle that contains the passengers and is under automatic driving control, at the stop location.

Second Embodiment

According to another embodiment, the controller 203 of the vehicle-mounted device 20 can carry out the process that is performed by the stop location determination unit 304, the driving route generator 305, and the stop determination unit 306 of the server 30, as described above. Therefore, even in the case in which communication between the vehicle-mounted device 20 and the server 30 is disconnected due to, for example, a failure of the network 5, the controller 203 of the vehicle-mounted device 20 can carry out the stop process shown in FIG. 8 and the remaining stop time display process shown in FIG. 10.

Figure 12:
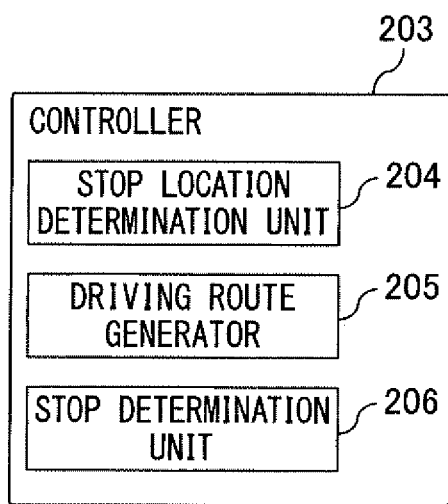
FIG. 12 is a functional block diagram of a controller of a vehicle-mounted device according to a second embodiment.

FIG. 12 is a functional block diagram of a controller 203 of a vehicle-mounted device 20 according to the second embodiment. The controller 203 includes a stop location determination unit 204, a driving route generator 205, and a stop determination unit 206. The stop location determination unit 204, the driving route generator 205, and the stop determination unit 206 have the same functions as the stop location determination unit 304, the driving route generator 305, and the stop determination unit 306 of the server 30, respectively.

The stop location determination unit 204, the driving route generator 205, and the stop determination unit 206 are realized as, for example, software modules or firmware embodied by computer programs executed on a processor. The stop location determination unit 204, the driving route generator 205, and the stop determination unit 206 may be embodied as arithmetic circuits formed in an FPGA or an ASIC.

Upon receiving a stop request by the passenger 4 who is riding in the vehicle 2 from the mobile terminal 40 of the passenger 4 or the touch display 215 through the internal communication I/F 201, the stop location determination unit 204 determines a stop location in accordance with the stop request.

The driving route generator 205 generates a driving route of the vehicle 2 from the present location of the vehicle 2 to the stop location.

The stop determination unit 206 calculates a stop time required to stop the vehicle 2 at the stop location based on a driving route to the stop location. When the stop time is less than an allocated time for the stop request, the stop determination unit 206 sends a stop command for moving the vehicle 2 to the stop location to the vehicle-mounted device 20 of the vehicle 2 through the internal communication I/F 201.

As described above, when the driving support apparatus is constituted by the vehicle-mounted device 20, the same effects as the first embodiment, in which the driving support apparatus is constituted by the server 30, can be obtained.

The above embodiments are merely practical examples of embodiment of the present invention, and the technical scope of the present invention is not limited thereby. The present invention can be carried out in various forms without departing from the technical principles or major features thereof.

According to another modification example, the driving support apparatus may command another server that manages information regarding the passenger 4 to charge an additional fee to the passenger 4, in accordance with a stop time required to stop the vehicle 2 at a stop location. Therefore, for example, when the passenger 4 has decided not to return to the vehicle 2, the passenger 4 will attempt to operate the departure permission button 43 shown in FIG. 11 as quickly as possible, in order to save the additional fee, and therefore, the vehicle 2 can move to the next destination sooner.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A driving support apparatus comprising:
a communication device configured to be able to at least communicate with a vehicle-mounted device installed in a vehicle that is under automatic driving control to a first destination; and
a processor configured to:
determine, upon receiving a stop request by a passenger who is riding in the vehicle from a mobile terminal of the passenger or the vehicle-mounted device of the vehicle through the communication device, a stop location in accordance with the stop request, the stop request being a request for a temporary stop prior to resuming navigation to the first destination;

generate a driving route of the vehicle from a present location of the vehicle to the stop location; and calculate a stop time required to stop the vehicle at the stop location, the stop time being based on: (i) the driving route to the stop location and (ii) an estimated waiting time at the stop location for keeping the vehicle at the stop location until the passenger reenters the vehicle prior to resuming navigation to the first destination, and when the stop time is less than an allocated time for the stop request, send a stop command for moving the vehicle to the stop location to the vehicle-mounted device of the vehicle through the communication device.

2. The driving support apparatus according to claim 1, further comprising:

a memory that stores a second destination and a target arrival time of an other passenger who is riding in the vehicle, wherein the processor generates a second driving route for moving the vehicle from the present location of the vehicle to the second destination of the other passenger via the stop location, and the processor calculates an expected arrival time at which the vehicle is expected to arrive at the second destination of the other passenger, the expected arrival time being after the vehicle has stopped at the stop location, based on the second driving route, and determines the allocated time in accordance with a margin time between the expected arrival time and the target arrival time.

3. The driving support apparatus according to claim 2, wherein when the stop time is equal to or greater than the allocated time, the processor sends a signal for displaying a query requesting permission to stop the vehicle at the stop location to a mobile terminal of the other passenger or the vehicle-mounted device of the vehicle, and upon receiving a signal indicating permission by the other passenger to stop the vehicle at the stop location from the mobile terminal of the other passenger or the vehicle-mounted device of the vehicle, the processor sends the stop command to the vehicle-mounted device of the vehicle.

4. The driving support apparatus according to claim 1, wherein upon receiving a signal indicating that the passenger has exited the vehicle stopping at the stop location from the mobile terminal of the passenger or the vehicle-mounted device of the vehicle through the communication device, the processor sends a signal for displaying a remaining stop time of the vehicle on the mobile terminal of the passenger to the mobile terminal of the passenger through the communication device.

5. The driving support apparatus according to claim 1, wherein when the stop time is equal to or greater than the allocated time, the processor retrieves a second vehicle that is present within a certain range from the present location of the vehicle, sends a signal for dispatching the retrieved second vehicle to a dispatch point within the certain range from the second vehicle through the communication device, and sends a signal for moving the vehicle to the dispatch point to the vehicle-mounted device of the vehicle through the communication device.

6. A driving support system comprising:

a vehicle-mounted device installed in a vehicle that is under automatic driving control to a destination, and a server connected to at least the vehicle-mounted device communicatable with each other through a network, wherein upon receiving a stop request by a passenger who is riding in the vehicle from a mobile terminal of the passenger or the vehicle-mounted device of the vehicle, the stop request being a request for a temporary stop prior to resuming navigation to the destination, the server determines a stop location in accordance with the stop request, generates a driving route of the vehicle from a present location of the vehicle to the stop location, and calculates a stop time required to stop the vehicle at the stop location, the stop time being based on: (i) the driving route to the stop location and (ii) an estimated waiting time at the stop location for keeping the vehicle at the stop location until the passenger reenters the vehicle prior to resuming navigation to the destination, and when the stop time is less than an allocated time for the stop request, the server sends a stop command for moving the vehicle to the stop location to the vehicle-mounted device of the vehicle, and upon receiving the stop command, the vehicle-mounted device moves the vehicle to the stop location.

7. A driving support method carried out by a server having a communication device that is configured to be able to at least communicate with a vehicle-mounted device installed in a vehicle that is under automatic driving control to a destination, the method comprising the steps of:

upon receiving a stop request by a passenger who is riding in the vehicle from a mobile terminal of the passenger or the vehicle-mounted device of the vehicle through the communication device, the stop request being a request for a temporary stop prior to resuming navigation to the destination, determining a stop location in accordance with the stop request;

generating a driving route of the vehicle from a present location of the vehicle to the stop location; and calculating a stop time required to stop the vehicle at the stop location the stop time being based on: (i) the driving route to the stop location and (ii) an estimated waiting time at the stop location for keeping the vehicle at the stop location until the passenger reenters the vehicle prior to resuming navigation to the destination, and when the stop time is less than an allocated time for the stop request, sending a stop command for moving the vehicle to the stop location to the vehicle-mounted device of the vehicle through the communication device.

\* \* \* \* \*